DAVID MULLIGAN & JOHN C. IMLAY.
Improvement in Lifting-Jacks.
No. 126,076. Patented April 23, 1872.
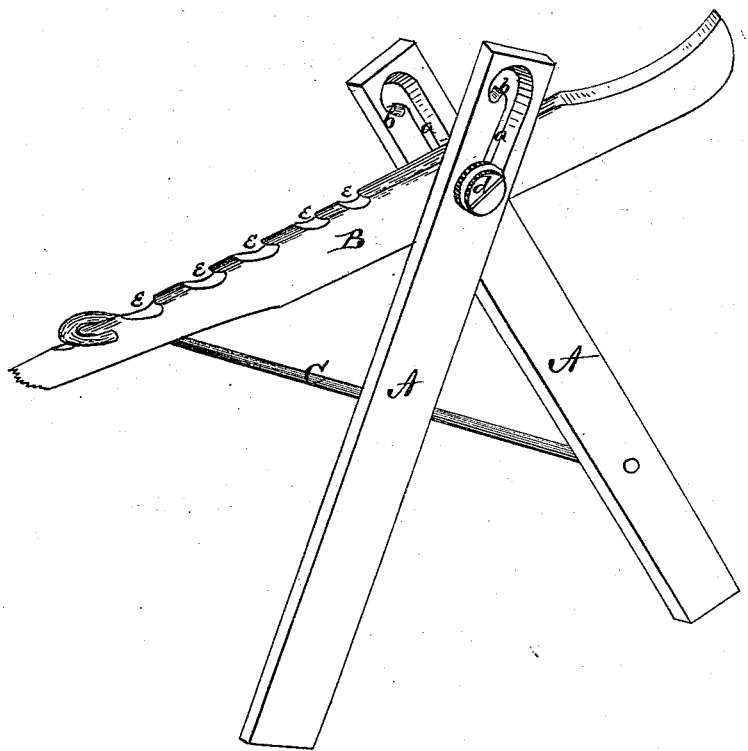
Witnesses:
Inventor 126,076

UNITED STATES PATENT OFFICE.

DAVID MULLIGAN AND JOHN C. IMLAY, OF GREENSBURG, INDIANA.

IMPROVEMENT IN LIFTING-JACKS.

Specification forming part of Letters Patent No. 126,076, dated April 23, 1872.

*To all whom it may concern:*

Be it known that we, DAVID MULLIGAN and JOHN C. IMLAY, of Greensburg, in the county of Decatur and in the State of Indiana, have invented certain new and useful Improvements in Lifting-Jacks; and do hereby declare that the following is a full, clear, and exact description thereof, reference being had to the accompanying drawing and to the letters of reference marked thereon making a part of this specification.

The nature of our invention consists in the construction and arrangement of a lifting-jack, as will be hereinafter more fully set forth.

In order to enable others skilled in the art to which our invention appertains to make and use the same, we will now proceed to describe its construction and operation, referring to the annexed drawing, which represents a perspective view of our lifting-jack.

A A represent the two legs of my lifting-jack, each provided near its upper end with a slot, *a*, running longitudinally with the leg, as shown. The upper end of each slot *a* is curved over, forming a hook, *b*. B represents the lever, pivoted between the legs A A by a headed bolt, *d*, passing through the slots *a a*. This lever may thus be pivoted at the lower ends of the slots, or be raised and pivoted on the hooks *b b*, and thus the lifting-jack be accommodated to either the front or rear axle of the wagon, as may be desired. The upper edge of the lever B is notched at *e e*, as shown, and a hook, C, pivoted to the front leg, catches in said notches, holding it any desired height.

Having thus fully described our invention, what we claim as new, and desire to secure by Letters Patent, is—

The combination of the legs A A, having slots *a a*, with hooks *b b*, the lever B having notches *e e*, and the hook C, all constructed and arranged substantially as and for the purposes herein set forth.

In testimony that we claim the foregoing we have hereunto set our hands this 26th day of February, 1872.

DAVID MULLIGAN.
JOHN C. IMLAY.

Witnesses:
THOS. D. PRICE,
THOMAS ROSZELL.